June 9, 1925.
T. L. VALERIUS ET AL
1,540,821
ICE CREAM BRICK MOLD RELEASER
Filed Aug. 10, 1921  2 Sheets-Sheet 2
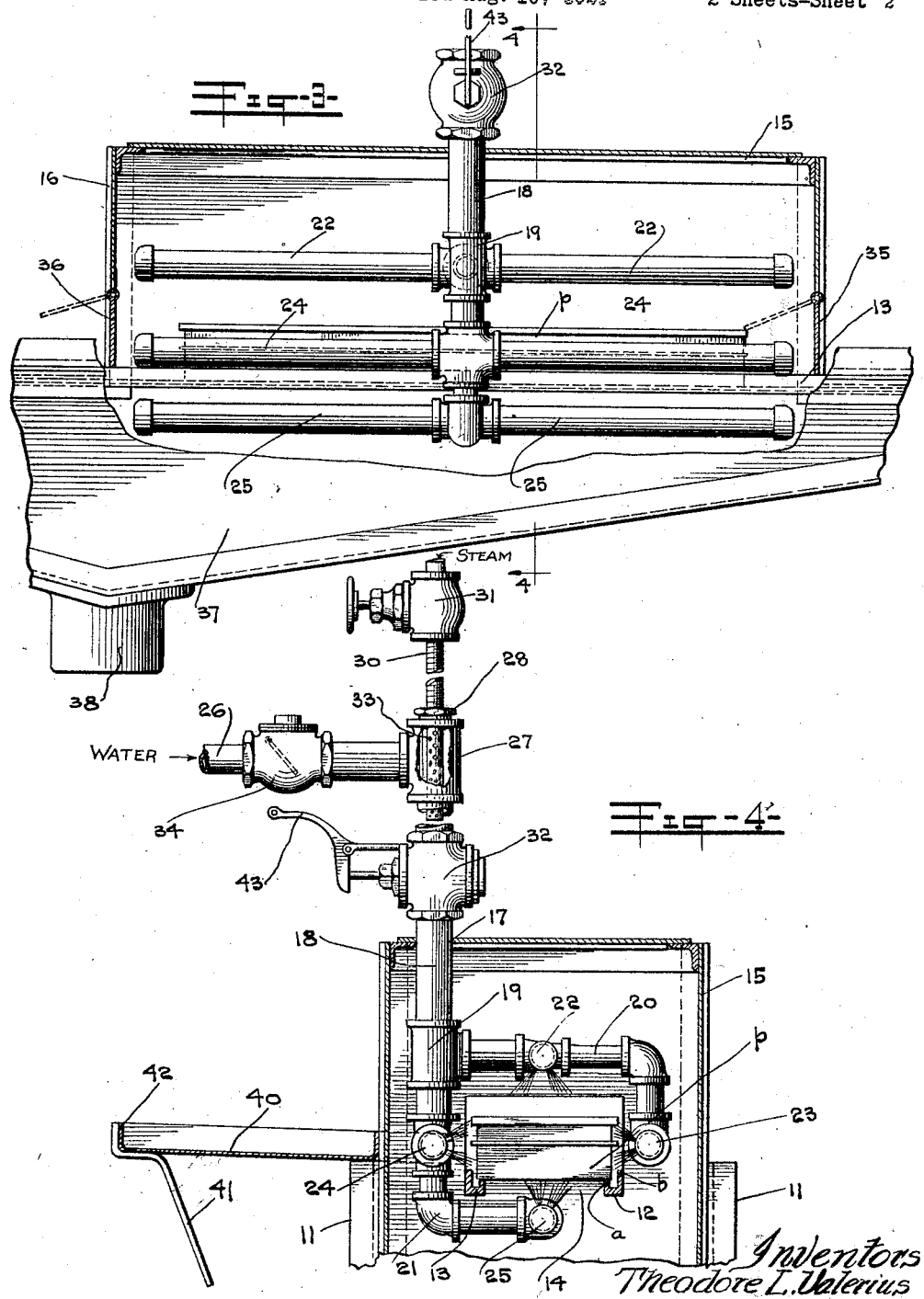
Inventors
Theodore L. Valerius
Olaf Larsen Patented June 9, 1925.

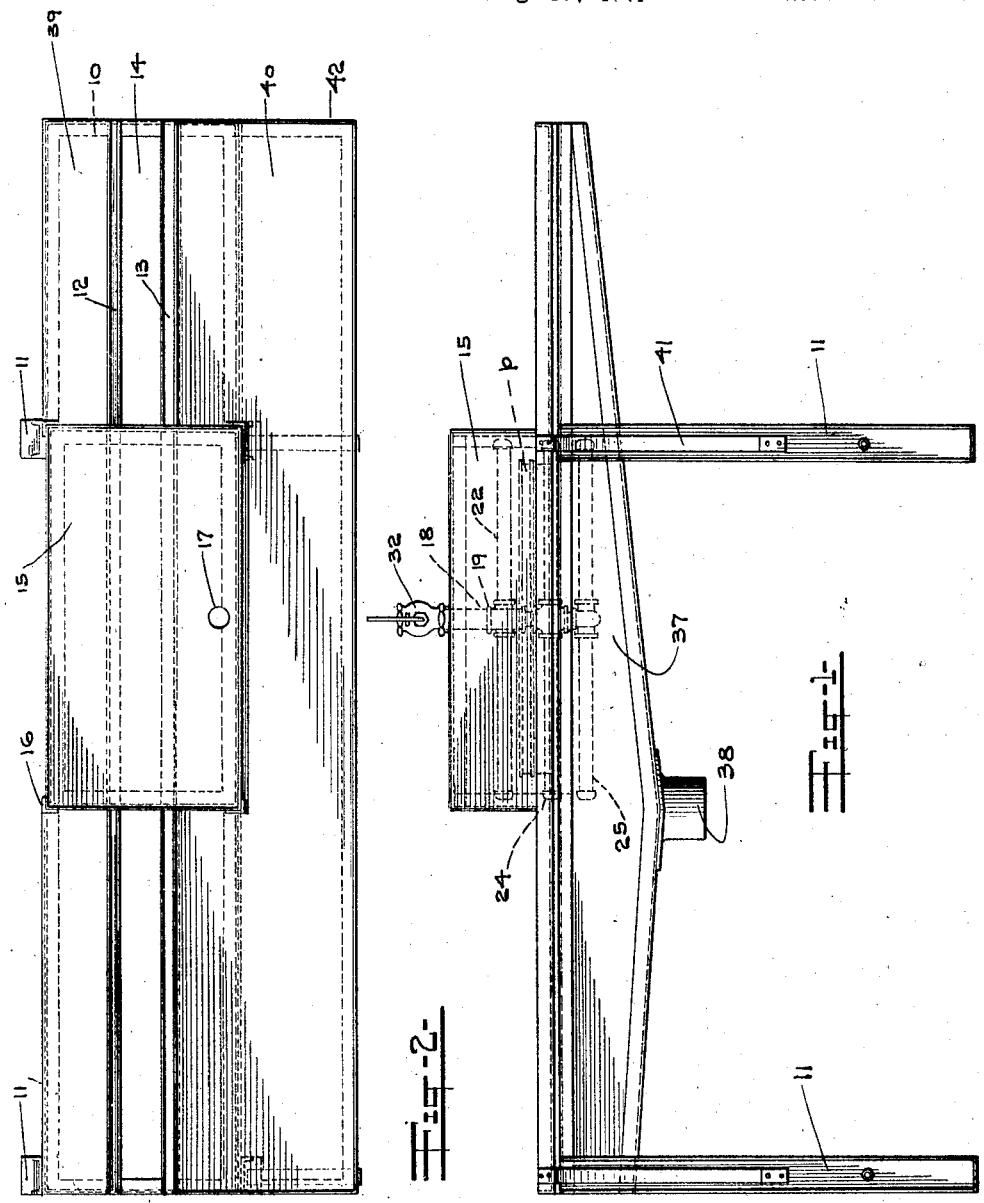

1,540,821

UNITED STATES PATENT OFFICE.

THEODORE L. VALERIUS AND OLAF LARSEN, OF FORT ATKINSON, WISCONSIN, ASSIGNORS TO THE CREAMERY PACKAGE MFG. COMPANY, OF CHICAGO, ILLINOIS, A CORPORATION OF ILLINOIS.

ICE-CREAM BRICK-MOLD RELEASER.

Application filed August 10, 1921. Serial No. 491,309.

*To all whom it may concern:*

Be it known that we, THEODORE L. VALERIUS and OLAF LARSEN, citizens of the United States, residing at Fort Atkinson, in the county of Jefferson and State of Wisconsin, have invented certain new and useful Improvements in Ice-Cream Brick-Mold Releasers, of which the following is a specification.

Our invention relates to ice cream handling apparatus and particularly to apparatus which will efficiently and in a sanitary manner release metallic molds from the ice cream frozen therein so that the cream may be dumped therefrom in the form of perfect slabs.

Ice cream which is intended to be sold in the form of bricks, slices or cubes is primarily of a consistency which will enable it to be readily placed in molds or pans. After being filled, the molds are placed in a freezing or hardening room where the contents solidify. As the cream freezes to the mold walls, the mold must be released from the cream before the cream can be dumped out and cut up into bricks or other portions. This releasing has heretofore been manually accomplished by dipping the molds into a tub of warm water. This is of course a very unsanitary and sloppy procedure; the water soon becomes soiled thus exposing the ice cream to contamination, and moreover, there is no uniformity of heating, some of the molds being warmed too much so that the cream becomes mushy and will not form a perfect slab when dumped from the mold, and other molds being insufficiently heated so that parts of the cream will remain on the mold walls after a dumping operation. This, of course, causes considerable annoyance and wastage.

The general object of our invention is to provide apparatus which will treat the filled molds in a more practical, sanitary and efficient manner to release them from the cream so that complete and perfect slabs will result after dumping.

More in detail, one important object of the invention is to provide spraying apparatus to which water at the proper temperature can be accurately fed, together with simple means for positioning the molds in the spray field.

Another important object is to uniformly distribute the water spray along the various sides of the molds so that uniform heating will result to a degree just sufficient to release the mold walls but to prevent melting of any of the cream.

Another important object is to entirely enclose the spraying mechanism and to provide means for receiving the drainage or drippings from the molds to thus insure sanitary surroundings for the apparatus.

The above and other features of our invention are incorporated in the apparatus shown in the accompanying drawings in which—

Fig. 1 is a front elevational view,

Fig. 2 is a plan view,

Fig. 3 is an enlarged front elevational view of the spraying mechanism with the enclosure structure in section, and Fig. 4 is a sectional view on plane 4—4, Fig. 3.

The apparatus supporting structure comprises the rectangular top frame 10 which may be formed of angle iron, and suitable legs 11 also preferably formed of metal. Secured to and extending between the ends of the frame 10 are the guide bars 12 and 13 of U-shaped cross section, these bars being spaced apart to leave the passageway 14 between them. The inner limbs $a$ of these bars serve as rails for the molds $p$, while the outer limbs $b$ of the bars are a little higher than the inner limbs to form guards for keeping the molds on the rails. Molds can thus be readily slid across the supporting structure.

On the frame 10 intermediate its ends a housing 15 is secured over the rail bars. As shown upright corner members 16 are secured to the frame 10 and hold the housing in proper position. Extending downwardly into the housing through a hole 17 in the top thereof is the main water supply pipe 18 which terminates in a fitting 19 with which connect the L-shape extensions 20 and 21. The upper extension 20 extends rearwardly and downwardly and the lower extension 21 extends downwardly and rearwardly. From the top section of the upper extension 20 the spray pipes 22 extend laterally and from the lower end of the extension 20 the pipes 23 extend laterally. From the vertical section of the extension 21 the spray pipes 24 extend laterally and from the end of the extension 21 the spray pipes 25 extend laterally. The spray pipes form a spraying or jetting field within the housing into which the molds are shifted on the rail bars. The spray pipes are provided with spray openings for directing jets of water against the top, bottom and sides of the filled molds, the water being of suitable temperature to warm the mold walls and effect quick release thereof from the contained cream. The water may be supplied from a warm water tank or it may be heated by means of steam at the spraying apparatus. We show a pipe 26 leading from a water source and connecting with the fitting 27. In the upper end of the fitting 27 is a reducing bushing 28 through which extends a steam pipe 30 to which steam flow is controlled by the valve 31. In the pipe 18 between the fitting 27 and the spray pipes is interposed a valve 32 which is preferably of the quick acting whistle type. If previously heated water is used for spraying, the steam valve 31 is closed and heated water flows from the pipe 26 to the spraying pipes under control of the valve 32. If it is desired to heat the water locally the steam valve 31 is opened so that steam is blown into the fitting 27 to mix with and heat the water before delivery to the spraying piping, the lower portion of the steam pipe 30 being preferably provided with distributing holes 33. In order to prevent steam flow into the pipe 26 when the valve 32 is closed and the steam valve 31 is open, a check valve 34 is interposed in the pipe 26.

In the end walls of the housing 15 and above the track rails 12 and 13 are hanging doors 35 and 36 which are of a sufficient size to permit passage of the molds. The operator places the molds on the rails and shoves them one at a time past the entrance door 35 until they are properly disposed within the spraying field. The door will then close and the apparatus is ready for a spraying operation. After a mold has been sprayed, another is pushed into the housing 15, which latter mold engages with and pushes out the sprayed mold through the exit door 36 where the operator receives it and pulls it out entirely.

To catch the spraying water a trough or tank 37 is secured below and extends the full length and width of the frame 10, the floor of the tank being inclined so that the water will flow through the outlet 38 into the sewer or other receptacle. The space between the rear rail 12 and the rear wall of frame 10 is closed by the top plate 39, and the space in front of the rail 13 is closed by the drip pan 40 which pan extends in front of the frame 10, is supported by braces 41 and has the peripheral flange 42. The pan extends around the housing 15 and is pitched toward the passageway 14 between the rails so that all drip water will flow through said passageway into the tank 27. The housing 15 at its lower end is entirely open to the tank so that the spent water flows to the tank.

In operation, the operator feeds the molds into the housing from the right side of the apparatus through the door 35 and after a mold is properly located he pulls the lever 43 of the valve 32, and holds the valve open a short time to permit thorough jetting and sufficient and uniform heating of the mold. The lever is then released. Before beginning to use the apparatus, the operator opens the steam valve 31 to a sufficient degree to keep the water ready at the proper temperature. During operation of the machine the temperature of the water can be controlled by manipulating the valve 31. After a releasing operation he removes the treated mold from the housing and inserts another mold. The treated molds are set on the drain pan 40 ready to be taken to the brick cutting machine.

With our improved arrangement there is no chance for water to splash around or drip on the floor and thus cause unsanitary conditions. The spraying to which the molds are subjected serves to clean the exteriors of the molds, thereby preventing dirt from being carried to the brick-cutting machine. Owing to the uniform distribution of the spraying jets the molds are uniformly heated and on account of the accurate control of the water flow by the quick acting valve 32 and the uniformity of temperature of the heated water, there is no chance for overheating or underheating, so that the discharged slabs are perfect and solid throughout.

In practice, this invention has contributed materially to the introduction of order, sanitation and pleasant working conditions in the brick department of ice cream plants.

We do not desire to be limited to the exact construction, arrangement and operation shown and described, as changes could be made which would still come within the scope of the invention.

We claim as our invention:

1. In apparatus of the class described, the combination of a housing having an entrance and an exit, guide members passing through said housing, jet pipes arranged within said housing around said guide members, and means for controlling the flow of heating medium to said pipes, said pipes forming a jetting field around ice cream molds slidably supported on said guide members for passage through said housing 2. In apparatus of the class described, the combination of supporting and guide rails, a housing over a section of said rails having an entrance and an exit for ice cream molds, jet pipes arranged within said housing to project water jets against all sides of a mold inserted on said rails in said housing, and means for controlling the flow of water to said pipes.

3. In apparatus of the class described, the combination of a supporting frame, guide and supporting rails extending longitudinally on said frame, a housing over a section of said guide rails having an entrance and an exit for molds resting on said rails, jet pipes arranged within said housing to form a jetting field around an inserted mold, means for controlling the flow of water to said pipes, and a trough supported on said frame for receiving the spent and drip water.

4. In apparatus of the class described, the combination of a plurality of jet pipes arranged to form a jetting field, a water supply pipe connected with said jet pipes, a steam supply pipe extending into said water supply pipe and adapted to discharge steam therein, a quick acting valve for controlling the flow of heated water to the jet pipes, an automatic valve for preventing a reversal of flow in said water supply pipe, and guide rails adapted to support ice cream molds for passage through said jetting field.

In testimony whereof we have hereunto set our hands.

THEODORE L. VALERIUS.
OLAF LARSEN.